June 6, 1933.    L. S. LONGENECKER    1,913,168
SUSPENDED REFRACTORY STRUCTURES
Filed April 4, 1930    6 Sheets-Sheet 1
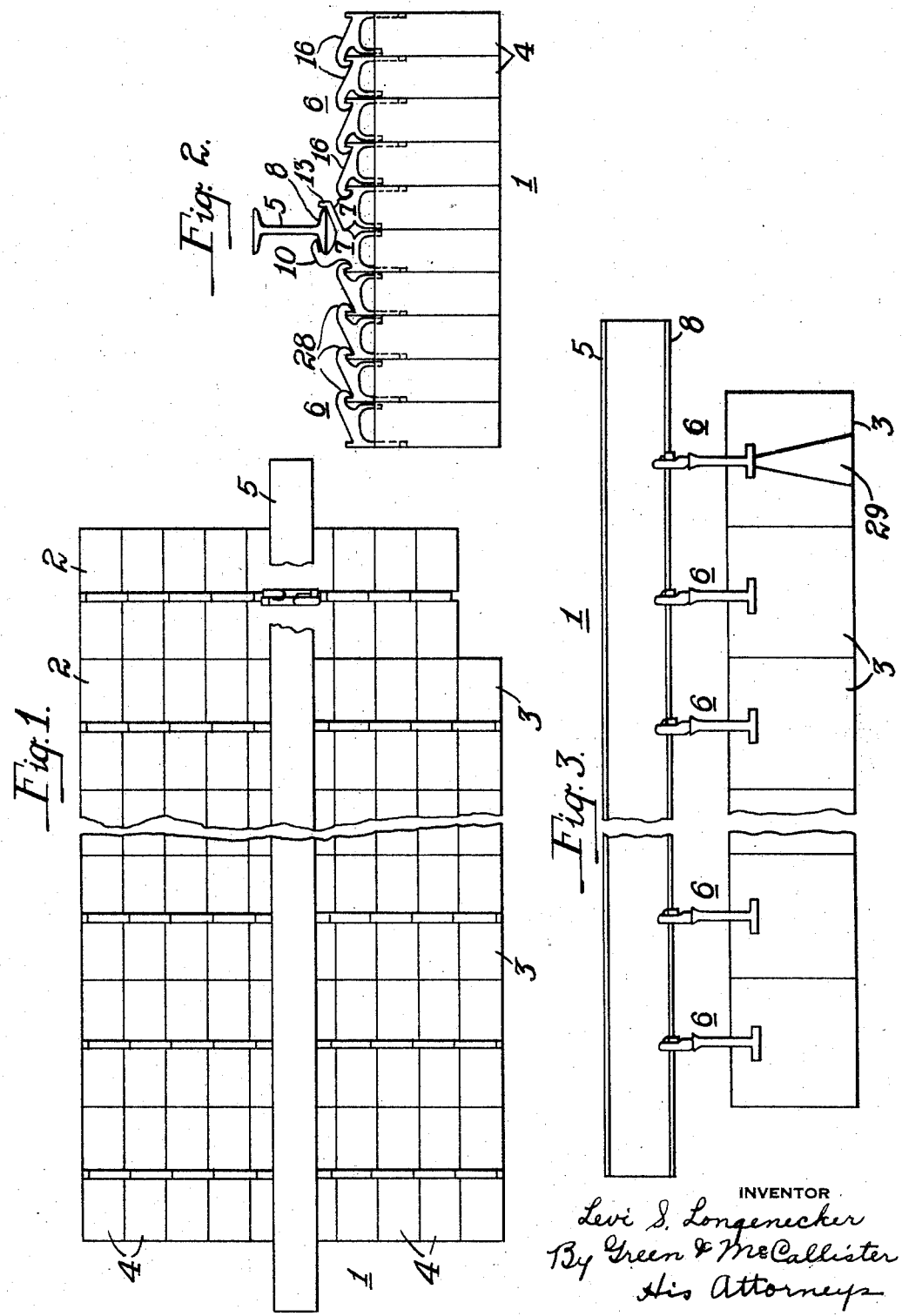

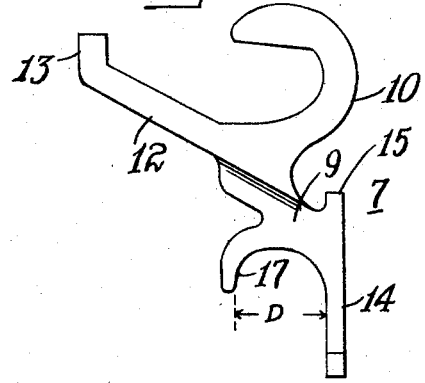
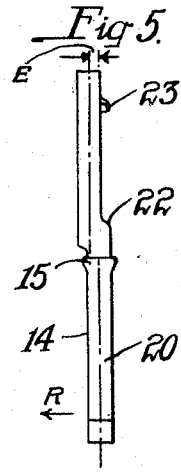
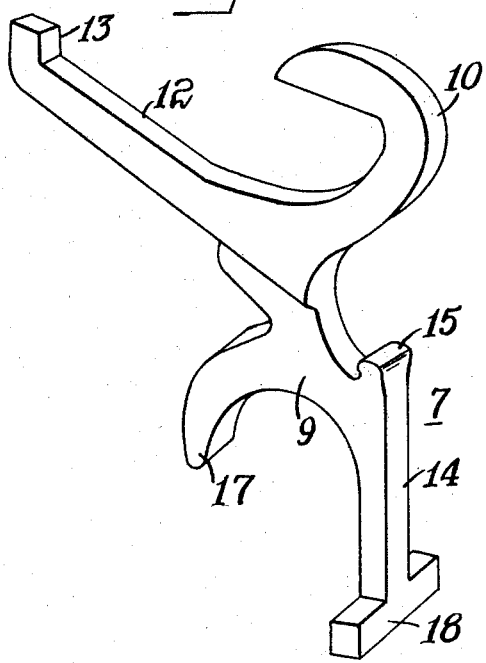
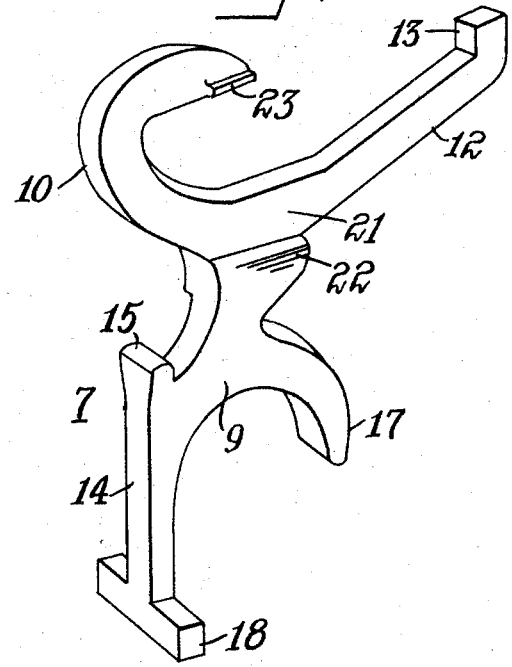

June 6, 1933.  L. S. LONGENECKER  1,913,168
SUSPENDED REFRACTORY STRUCTURES
Filed April 4, 1930   6 Sheets-Sheet 3
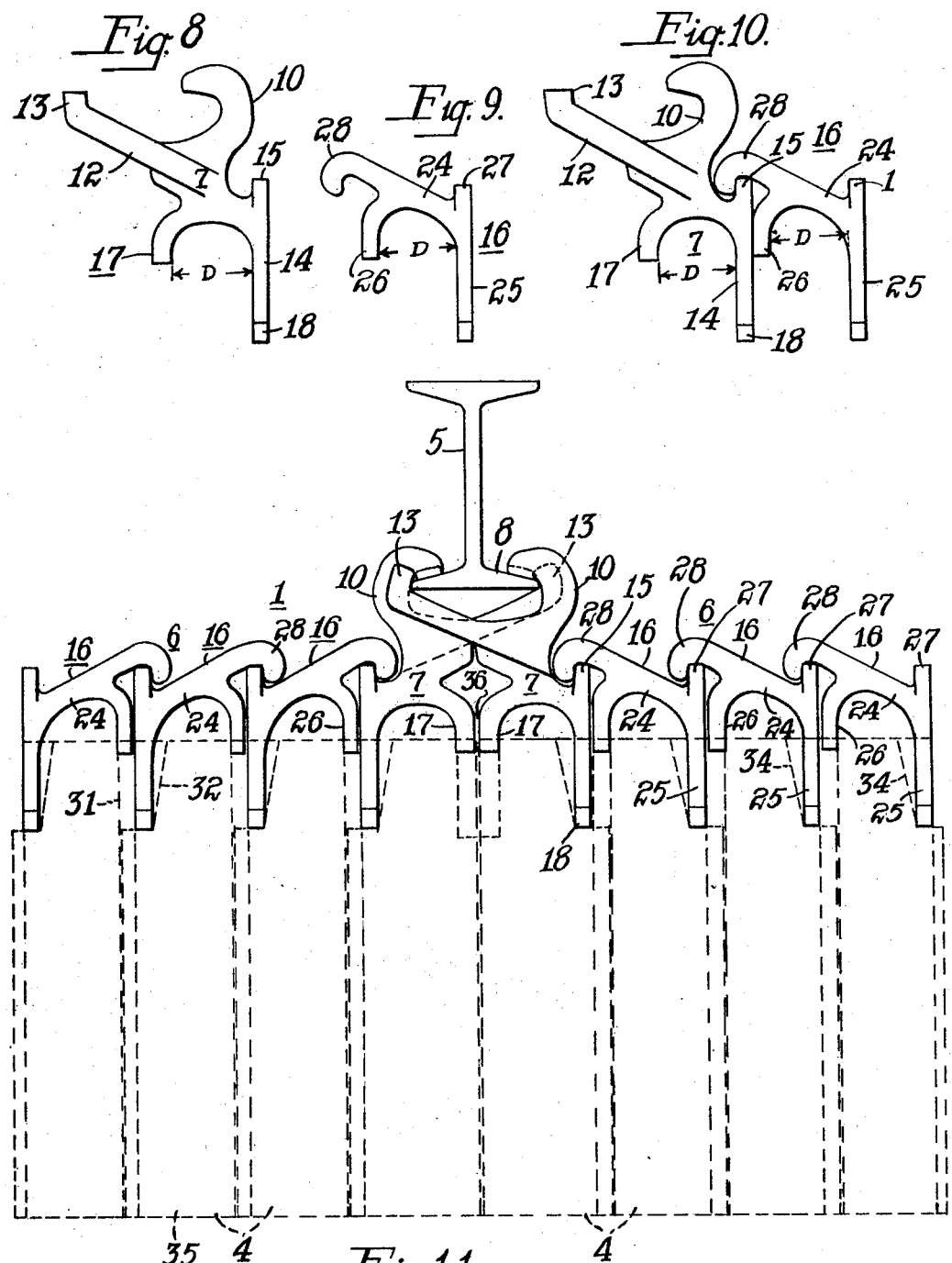

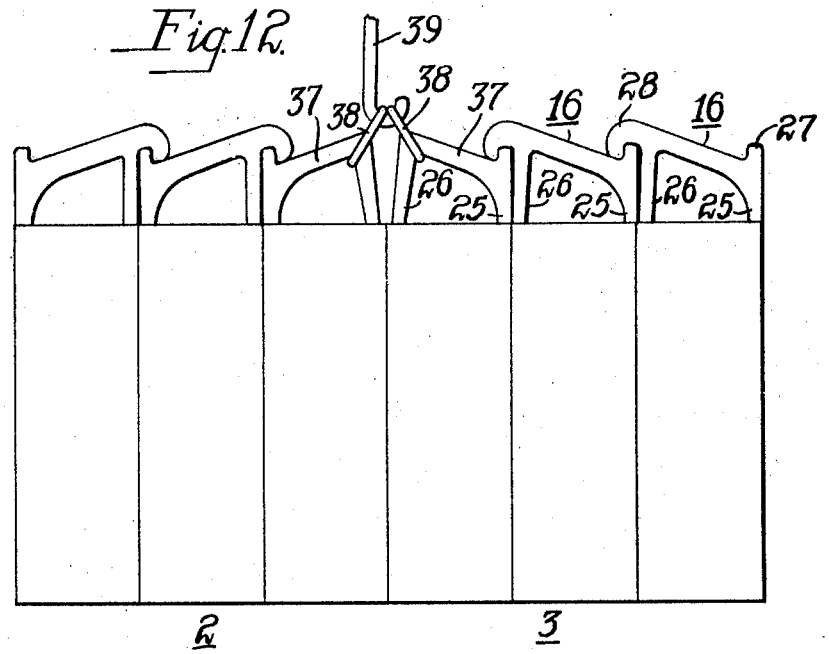
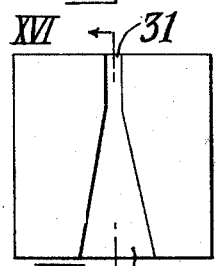
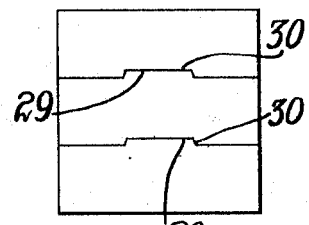
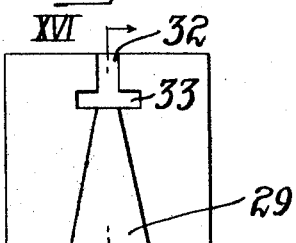
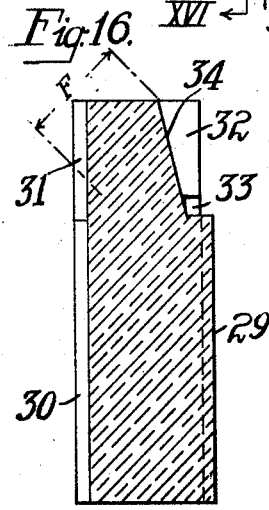
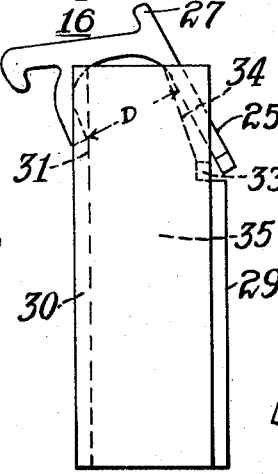
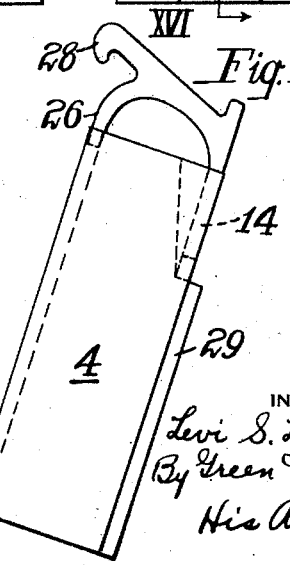

June 6, 1933.  L. S. LONGENECKER  1,913,168
SUSPENDED REFRACTORY STRUCTURES
Filed April 4, 1930   6 Sheets-Sheet 5
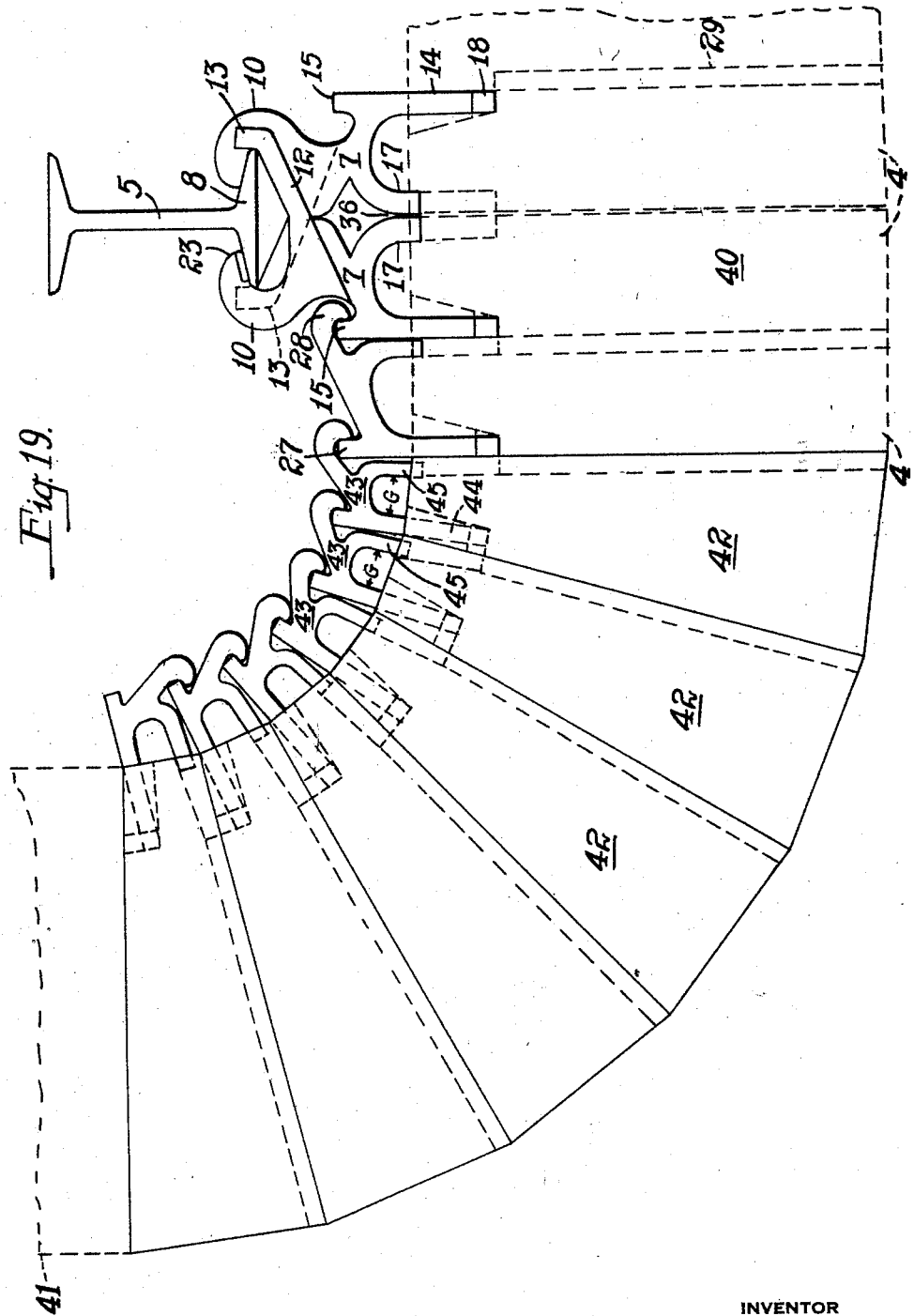
INVENTOR
Levi S. Longenecker
By Green & McCallister
His Attorneys June 6, 1933.  L. S. LONGENECKER  1,913,168
SUSPENDED REFRACTORY STRUCTURES
Filed April 4, 1930   6 Sheets-Sheet 6

INVENTOR
Levi S. Longenecker
By Green & McCallister
His Attorneys

Patented June 6, 1933

1,913,168

UNITED STATES PATENT OFFICE

LEVI S. LONGENECKER, OF PITTSBURGH, PENNSYLVANIA

SUSPENDED REFRACTORY STRUCTURES

Application filed April 4, 1930. Serial No. 441,693.

This invention relates to refractory structures employed in furnaces and more particularly to structures in which the refractory blocks are individually removably supported in position.

An object of this invention is to provide means for individually supporting refractory blocks, tiles and the like in such a manner that the individual blocks will be so biased that engaging faces thereof will be held positively in engagement.

Another object of the invention is to provide means for suspending individual blocks which, when mounted in place, form a built up cantilever beam, in which the individual block supporting means are each supported by and anchored to adjacent block supporting means.

A further object of the invention is to provide a structure comprising blocks laid up in rows in which the individual blocks of each row are suspended from a point removed from a line passing through the center of gravity of the blocks so that adjacent faces of the blocks will be biased towards engaging position.

A still further object of the invention is to provide a suspended refractory structure comprising blocks or tiles laid up in rows, in which the supporting and suspending structure therefor will be protected from the temperatures to which the blocks are subjected in operation.

Other objects of the invention will in part be apparent, as will, in part, be obvious from the following description taken in conjunction with the accompanying drawings in which:

Figure 1 is a fragmentary top plan view of a suspended refractory structure arranged and constructed in accordance with the invention.

Fig. 2 is an end view of the structure shown in Fig. 1;

Fig. 3 is a view in side elevation of the structure shown in Fig. 1;

Fig. 4 is a view in side elevation of a cantilever beam member which forms the fixed end of the beam which carries the tile or blocks of the suspended structure;

Fig. 5 is an end view in elevation of the beam member shown in Fig. 4;

Figs. 6 and 7 are views in perspective of the beam member shown in Figs. 4 and 5;

Fig. 8 is a view of the device shown in Fig. 4;

Fig. 9 is an end view in elevation of a cantilever beam member embodied in the refractory structure shown in Figs. 1, 2 and 3;

Fig. 10 is a view of the beam members shown in Figs. 8 and 9 illustrating the manner in which the beam members are assembled to form a built up cantilever beam;

Fig. 11 is an enlarged view similar to Fig. 2 showing two cantilever beam members supported from an I-beam, and indicating by broken lines, the relative positions of refractory blocks suspended or hung from each beam member;

Fig. 12 is a modified form of a suspended refractory structure arranged and constructed in accordance with the invention;

Fig. 13 is a view in elevation of one face of a refractory block or tile embodied in the structure shown in Figs. 1 to 3, inclusive, 11 and 12;

Fig. 14 is an end view of three blocks, each similar to the block shown in Fig. 13, laid up in operative position;

Fig. 15 is a view in elevation of the opposite face of the block shown in Fig. 13;

Fig. 16 is a view in section of the block shown in Figs. 13 and 15 taken on line XVI—XVI thereof;

Fig. 17 is a view in side elevation of the block or tile shown in Figs. 13 to 16, inclusive, illustrating the position the cantilever beam member shown in Figs. 8 and 9 takes before attaching them to a block or tile in operative position;

Fig. 18 is a view similar to Fig. 17 showing a cantilever beam member attached or mounted in place on a block and illustrating the position which the block will take if suspended by itself from the hook portion of the beam;

Fig. 19 is a view in side elevation of a suspended refractory nose construction which may be embodied either in a furnace or boiler, for example, or in any construction where angularly disposed walls must be joined to form a continuous refractory structure;

Throughout the specification and the drawings like reference characters indicate like parts.

Figure 20:
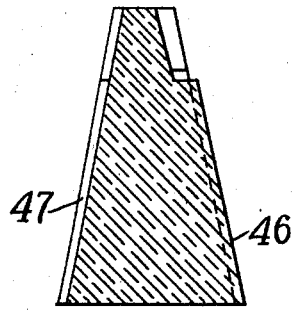
Fig. 20 is a view in section of a wedge block or tile embodied in the nose construction of Fig. 19.

Referring now to the drawings and more particularly to Figs. 1, 2, 3 and 11, a suspended refractory structure 1 is shown that comprises a plurality of rows 2 and 3 of refractory blocks 4 that are supported by an I-beam 5. The I-beam 5 forms part of a super-structure (not shown) from which the rows of blocks or tiles 2 and 3 and the I-beam 5 are supported in operative position.

As shown, each row of blocks 2 and 3 is of cantilever-beam type construction. These rows extend in opposite directions from the beam 5 and in alignment with each other. The rows of blocks 2 and 3 are so assembled and mounted on the beam 5 that the rows on one side of the beam are counterbalanced by the rows on the other side.

In some cases, the roof structure may be inclined or sloping rather than horizontal, and when so arranged, a greater number of blocks may be placed in the rows on one side of the I-beam 5 than the other. This would be done in order that the rows on one side of the I-beam 5 may counterbalance the rows on the other side and also cause the rows to be biased towards the desired inclined or sloping position.

If two rows 3 and 4 do not cover the area or surface required, another I-beam 5 may be mounted parallel to the I-beam shown in Fig. 1. On this I-beam rows 3 and 4 of blocks may be mounted so that a continuous structure is obtained. Any number of I-beams may be employed depending upon the size of the refractory structure required, and in such structures each I-beam will support two rows 2 and 3 of blocks.

Each block 4 of each row is individually suspended or supported from a built-up cantilever beam designated in its entirety by the reference character 6. Also, each block 4 is hung off-center from the beam 6, as will be hereinafter set forth, so that each block is biased towards the I-beam 5.

By the form of construction employed, each block 4 tends to assume an inclined position and would, if removed from the assembled structure shown in Figs. 1, 2, 3 and 11 and hung or suspended by itself from a support, swing to or assume the inclined position shown in Fig. 18 of the drawings.

Since each block in the rows 2 and 3 is hung or suspended off-center in the manner referred to above, all of the blocks will be biased in a direction towards the I-beam 5 because each block tends to swing to the inclined position shown in Fig. 18. Because of this tendency of the blocks to swing to or assume the inclined position shown in Fig. 18, adjacent faces of each block or tile 4 forming the several rows 2 and 3, are held positively in engagement so that, as has been found in practice, cement is not required to seal the joints between adjacent faces of the blocks to prevent hot or burning gases from reaching or attaching the cantilever beam 6.

As the cantilever beams 6 are all similar in construction, only one need be described in detail.

The beam 6 comprises a beam member 7 so constructed that it can be hung in place on the flange or base 8 of the I-beam 5. This beam member 7, for descriptive purposes, may be designated as one that forms the fixed or anchored end of the cantilever beam 6. The beam member 7, as clearly illustrated in Figs. 4 to 8, inclusive, and 10, comprises a beam portion 9 having a hook 10 formed integral with the top side thereof. The hook 10 is so shaped that, when in operative position, it fits over one edge of the base or flange 8 of the I-beam 5 and rests or bears thereon. The hook 10, because of the nature of construction of the beam 6, is subjected to the shear stress imposed by the weight of the beam 6 and the blocks 4 suspended therefrom. Therefore, in practice, the hook 10 is designed to effectively take this shear stress.

In order to prevent the cantilever beam 6 from turning about the flange 8 of the I-beam 5 and at the same time permit a relatively small amount of turning of the beam on the flange, an arm or finger 12 is formed integral with the top side of the beam portion 9. As shown, the arm or finger 12 is provided with an upwardly extending portion 13 which lies adjacent to the opopsite edge of the flange 8 when the beam member 7 is mounted in operative position as shown in Figs. 2 and 11.

The distance between the upwardly extending portion 13 of the arm or finger 12 and the body of the hook 10 is such as to accommodate the base or flange 8 of the I-beam. The beam member 7 may be designed to fit the particular size of I-beam employed, it being understood that the size of the I-beam may be varied according to the load it must carry or sustain.

The beam member 7 is provided with a depending leg 14 of substantially T-shape which is adapted to be received in a slot of similar shape formed in the blocks or tiles 4. Directly above the depending leg 14 of T-shape the beam member 7 is provided with an upstanding lug or anchor 15 somewhat wider than the leg 14. The anchor 15 is adapted to support a cantilever beam member 16 and also to anchor it in place.

The opposite end of the beam portion 9 of the beam member 7 is provided with a depending leg 17 which is shorter in length than the leg 14. The distance D between the legs 14 and 17 is less than the thickness of the blocks 4. When a block or tile 4 is suspended from the T-shaped leg 14 the shorter leg 17 lies in a groove in the block, and bears or reacts against the top edge of the block to prevent its turning about cross bar 18 of the leg 14.

In order that the hooks 10 supporting rows 2 and 3 may so interfit with each other that the rows 2 and 3 will lie in alignment, as shown in Fig. 1, the hook 10 and the arm or finger 12 of each beam 7 are offset a distance E with respect to a vertical line 20 passing through the center of the legs 17 and 14 (see Fig. 5). Therefore, when two beam members 7 are mounted in place on the I-beam as shown in Figs. 1, 2 and 11, the arm or finger 12 of one member will lie along face 21, of the hook 10, and the arm or finger 12 of the other member 7 and directly above a shoulder 22 formed by offsetting the same with respect to the line 20. Because the hook 10 and arm or finger 12 of the beam members 7 are offset in this manner, the short legs 17 will be adjacent to each other and lie in alignment, which, of course, will permit the rows of blocks 2 and 3 to lie in alignment as indicated more particularly in Fig. 1 of the drawing.

Since the hook portion 10 of the beam member 7 lies to one side of the median line 20 of the leg 14, the beam member 7 will tend to turn or swing sidewise in the direction of the arrow R, as viewed from Fig. 5. In order to prevent such turning of the beam member 7 in the direction of the arrow R, when blocks 4 are suspended from the beam 6, the hook 10 is provided with a flange 23 that extends in a direction towards the median line 20. The point of the contact between the hook 10, the flange 23 and the flange 8 of the I-beam will, therefore, be substantially coincident with the line 20. As the center of mass or gravity of the blocks or tiles lies along the line 20, the beam members 7 will not turn or swing to an inclined position.

The cantilever beam member 16 comprises a beam portion 24 and two depending legs 25 and 26 of substantially the same shape and construction as the legs 14 and 17 of the beam member 7. The beam member 16 is also provided with an upstanding lug or anchor portion 27 from which a beam member 16 may be suspended and anchored thereto as shown in the drawings.

The beam member 16 is provided with a hook 28 at one end of the beam portion 24 so shaped that it will over-lie the top of the anchor portion 15 of the beam member 7 or the anchor portion 27 of a beam member 16 (see Fig. 11). As shown in Fig. 10, the leg 26 of the beam member 16 bears against the leg 14 of the beam member 7.

It is to be noted that the beam portion 9 of the beam member 7 and the beam portion 24 of the beam member 16 are inclined at an angle, the angle being such that these beam portions lie in substantially parallel planes when the beam 6 is assembled. For this reason the cross bars of the T-shaped legs 14 and 28 will lie in the same plane. It is, therefore, apparent that the lowermost ends of the blocks or tiles 4, when laid up in rows, will lie in substantially the same plane.

A cantilever beam 6 of any desired length may be built up or assembled from a beam member 7 and a plurality of beam members 16.

The blocks 4 which are carried by the cantilever beam 6 are illustrated more particularly in Figs. 13 to 18, inclusive. Each block or tile is provided with a tongue 29 of generally triangular form with the apex thereof lying uppermost. The tongue 29 occupies approximately three-fourths of the length of the block. The opposite side or face of the block is provided with a groove 30 of substantially the same shape or form as the tongue 29 and occupies the same relative position. The upper end or the apex of the groove 30 terminates in a relatively narrow groove 31. Groove 31 is of such width and depth as to accommodate the short legs 17 and 26 of the beam members 7 and 16. The depth of the groove is such that the short legs 17 and 26 will lie within the groove as illustrated more particularly in Figs. 11 and 18 when the blocks are laid up in rows.

Each block 4 is provided also with a groove 32 of T-shape directly above the apex of the tongue 29, that terminates at the top of the block as shown in Figs. 15 and 16.

When the blocks 4 are laid up in rows, the tongues 29 fit into the grooves 30 of adjacent blocks as shown in Fig. 14.

When the beam members 7 and 16 are attached to the blocks 4, the cross bars of the legs 14 and 25 thereof lie in a cross groove 33 of the T-shape groove 32 and the vertically extending portion of these legs are within the vertical portion of the groove.

The vertically extending portion of the groove 32 is provided with a sloping wall or bottom 34 which slopes generally upward towards the middle of the upper end of the block as shown in Fig. 16. The angle of slope of the bottom or wall 34 is such that the distance F between the bottom of the groove 31 and the bottom of the groove 32 is less than the distance D between the depending legs of the beam members 7 or 16, so that the beam members may be mounted in place on the blocks.

The blocks 4 are of the general shape and form as the blocks covered by my United States Letters Patent No. 1,590,303, granted January 29, 1926. The blocks shown in the patent, however, are not provided with the T-shaped groove 32 located directly above the tongue 26 nor the narrow slot 28 which accommodates the short legs 17 and 27 of the beam members.

In building or assembling a refractory structure such as shown in Figs. 1, 2, 3 and 11 of the drawings, the assembly begins at the I-beam 5. A beam member 7 is attached to the first block 4 of the row or course so that the cross bar 18 lies in the cross slot 33 of the block. The block is then lifted bodily by the beam member 7 and the hook 10 of this beam is placed in position on one side of the flange 8 of the I-beam. The weight of the block will then cause the beam 7 to swing under the I-beam until the arm or finger 12 bears against the bottom edge of the opposite side of the flange 8. The upstanding portion 13 of the arm or finger 12 will then occupy the position shown in Figs. 2, 11 and 19 and prevent the beam member 7 from sliding off the flange 8 of the beam 5.

In the structure shown in the drawings, Figs. 1, 2 and 3 for example, the first block in each row 2 and 3, that is, the blocks supported by the beam members 7, is made smooth on the face opposite to the tongue face 29 and the groove 30 is eliminated. The groove 31, however, is employed so that the short legs 17 of the beam members 7 may be hidden in the blocks and shielded from furnace temperature and burning gases. Also the end block of each row is made smooth on the tongue face 29 (see Figs. 1 and 3 when one block at the end of a row 3 is removed to show that the last or outer block is smooth and does not have a tongue 29).

The next block in the row is carried by a beam member 16 suspended from and anchored to the anchor portion 15 of the beam member 7. The first step of attaching the beam member 16 to a block 4 is indicated in Fig. 17. When so placed as indicated in Fig. 17, the cross bar of the leg 28 is adjacent to the cross groove 33 of the groove 32. By raising and turning the beam member 16 towards a vertical position, the cross bar of the leg 25 will enter and lie in the cross groove 33. The block may now be lifted bodily by the beam member 16 serving as a handle, into operative position and the hook 28 placed over the anchor portion 15 of the beam member 7. The remaining blocks in a row are mounted in place in the same manner, so that when the row is completed, the hook 28 of each beam member 16 engages the anchor portion 27 of an adjacent beam member. Each block is, therefore, individually supported by a beam member 16 and each beam member is anchored to and supported by an adjacent beam member.

An advantageous feature of the suspended structure herein illustrated is that rows of blocks may be assembled from a position above the structure. Each block is lowered into place, and for this reason the operator or worker can easily observe how the blocks are being placed. Another advantage of the construction is that burned out or broken blocks can be removed through the top of the structure and replaced by new blocks from above by merely lowering a block by its suspending beam 16.

Since the cross groove 33 of the T-shaped groove 32 lies adjacent to the face of the block on which the tongue 29 is formed and is removed from a vertical line 35 passing through the center of gravity of the block, the block will tend to turn in a counter-clockwise direction as viewed from Fig. 17 about the cross bars of the individual beam members 7 and 16. However, since the short legs 17 and 26 of each beam member are within and engage the bottom of the groove 31 on the opposite face of the block and at a point near to the top of the block, the block is prevented from turning about the cross bars of the beam members.

When a beam member 16 is attached to a block as shown in Fig. 18 and the hook portion 28 of the beam member is mounted in place on the anchor portion 27 of an adjacent beam member, the block is suspended from a point removed from the face of the block containing the triangular groove 30 and hence is suspended from a point remote from a vertical plane parallel to the face containing the groove 30 and passing through the center of gravity of the block. It is, therefore, apparent that the blocks will tend to swing to the inclined position illustrated in Fig. 18. This tendency of the blocks to turn or swing to this inclined position will cause the tongue 29 of one block to lie snugly within the groove 30 of an adjacent block.

It is to be noted that since the thickness of the short legs of the beam members is less than the depth of the groove 31 of the blocks 4, the blocks are permitted to snugly engage each other because the short leg of each beam member is spaced from the T-shaped legs of the adjacent beam member, as indicated more clearly in Fig. 11 of the drawings. It is, therefore, apparent that the legs 17 do not interfere with the blocks assuming a snug interfitting relation as shown in Fig. 14.

When the rows of blocks are laid up on each side of the I-beam 5, each row of blocks on one side of the beam 5 is counter-balanced by a corresponding row on the other side. This is so because the blocks 4 supported by the beam members 7 positively engage each other in abutting relation. Since the grooves 31 in the blocks are deeper than the thickness of the legs 17, the legs 17 of the beam members 7 will be spaced apart as indicated at 36 of Fig. 11 so as to permit the blocks 4 suspended therefrom, to be pressed firmly in engagement with each other (see also Fig. 2). The pressure between the engaging faces of the blocks 4 suspended from the beam members 7 is dependent upon the force of compression set up by the bending moment of the beams 6 and the blocks carried thereby at the beam 5. The bending moments being substantially equal, the rows of blocks on each side of the beam are counter-balanced one by the other; therefore, in practice there will be substantially no torsional strains imposed on the beam 5.

When the suspended refractory structure 1 is employed in metallurgical furnaces or in boiler furnaces, the blocks 4 are usually subjected to extremely high temperatures. It is, therefore, a necessary requisite to satisfactory operation of such furnaces that the cantilever beam members 7 and 16 be protected from these temperatures. By the form of construction embodied in the blocks 4, it is apparent from the drawings that the legs 17 and 14 of the beam members 7 lie within the grooves 31 and 32. Since these grooves are closed at their bottoms by the triangular-shaped tongues and grooves of the blocks, radiant heat from the furnaces cannot strike the beam members 7 and 16. It is, therefore, apparent that the cantilever beams 6 will not be heated to injurious temperatures until the blocks or tiles 4 have practically burned away, hence long life of the structure is insured.

In Fig. 12 of the drawings, a modified form of cantilever beam construction is shown. In this modification beam members 37 are substituted for the beam members 7. Beam members 37 do not have the hooks corresponding to the hooks 28 of the beam members 16, but are substantially similar in other respects.

Each beam member 37 carries the total load of a row of blocks. These beam members are provided with links 38 through which the hook portion of a J-bolt 39 passes. The rows of blocks are supported by the J-bolts which in turn are attached or secured to a super-structure (not shown).

In Fig. 19 of the drawings a suspended refractory nose structure is shown. Nose structures of this type are usually employed where two walls disposed at an angle to each other, or where the walls are parallel but occupying different elevations, are to be joined. The nose structure shown in Fig. 19 joins a horizontal suspended refractory structure or wall 40 and a vertical wall 41 indicated by broken lines.

The wall 40 is substantially horizontal and is similar in construction to the suspended refractory structure shown in Figs. 1 to 3, inclusive, and 11 and embodies the structural elements thereof; accordingly, similar or like parts of Fig. 19 are designated by the same reference characters.

The nose which joins the two walls 40 and 41 comprises wedge blocks 42 that are suspended from cantilever beam members 43 similar in construction to beam members 16. The beam members 43 differ merely in this respect—the distance G between the T-shaped legs 44 and the short legs 45 is less than the distance D between the legs of the beam members 7 and 16. The beam members 43 are purposely made to differ in this respect because the uppermost ends of the wedge blocks are thinner than the lowermost ends thereof as is obvious by inspection of Fig. 19.

The construction of the wedge blocks 42 is illustrated clearly in Fig. 20 where one of the blocks is shown in section. By comparing Fig. 20 to Figs. 13 to 18, inclusive, it is obvious that the only difference between blocks 4 and 42 is the shape, the latter being of wedge shape. Like the blocks or tiles 4 each of the wedge blocks 42 have a projection or tongue 46 of generally triangular form on one face and a groove 47 on its opposite face of substantially the same shape and form and occupying substantially the same relative position as the tongue.

When the wedge blocks are laid up in the form of a nose or arch as shown in Fig. 19 the tongue or projection of one block lies in the groove of an adjacent block; also the hook of each beam member 43 is anchored to and supported by the anchor portion of an adjacent beam member. The beam members 43 are attached to the blocks in the manner illustrated in Figs. 17 and 18.

Figure 21:
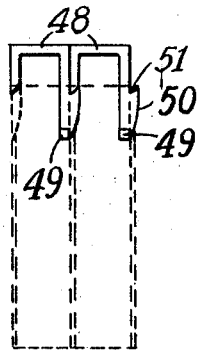
Fig. 21 is a view in side elevation of a modified form of cantilever beam construction for individually supporting refractory blocks or tiles of the type shown in Figs. 13 to 18, inclusive.
Figure 22:
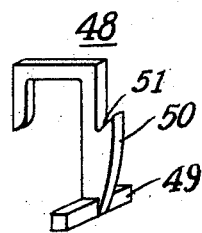
Fig. 22 is a view in perspective of a cantilever beam supporting the refractory blocks or tiles of Fig. 21.

In Fig. 21 of the drawings, a modified form of beam member 48 is shown. The beam member 48 is of substantially L shape, the long leg thereof being provided with a cross bar 49 so that the long leg is of substantially T-shape. The T-shaped leg of the beam 48 is received in the T-shaped groove 30 of the block 4 in the same manner as the T-shaped legs of the beam members 7 and 16 are received in these grooves. The T-shaped leg of the beam members 48 is provided with a boss or lug 50 that extends outwardly therefrom so as to provide a V-shaped notch 51 therein. The short leg of one beam member 48 is supported in the V- shaped notch 51 of an adjacent beam member as indicated in Fig. 21. Beam member 48 is illustrated in perspective in Fig. 22.

Figure 23:
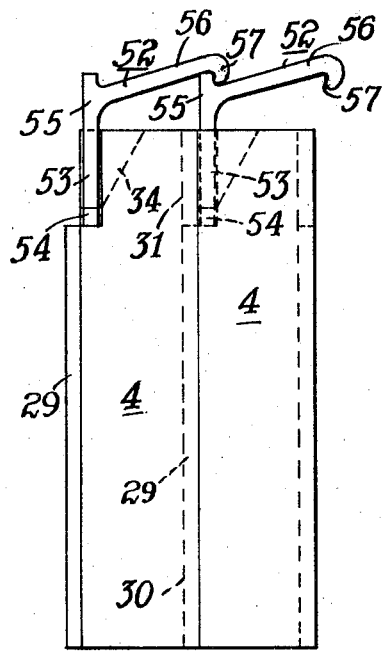
Fig. 23 is a view in side elevation of a still further modified form of suspended refractory structures.
Figure 24:
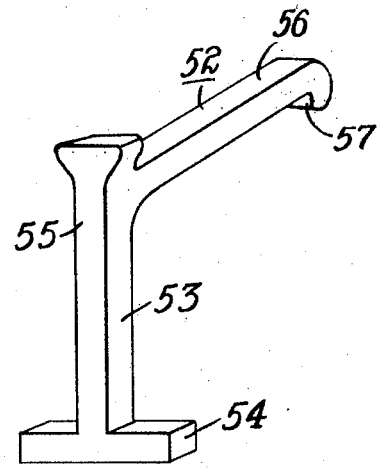
Fig. 24 is a view in perspective of the modified form of beam member suspending the refractory blocks of Fig. 23.

In Fig. 23 of the drawings two blocks 4 are shown that are suspended from beam members 52. Beam members 52 each have a leg 53 of T-shape, a cross bar 54 being at the lowermost end thereof. The leg 52 including the cross bar 54 is received by the T-shaped groove of the block which lies directly above the apex of the triangular shaped tongue or projection 29. The upper end of the T-shaped leg 53 terminates in an anchor portion 55. An arm or beam portion 56 extends laterally away from the T-shaped leg 53 and is inclined upwardly at an angle, the free end of the arm or beam portion 56 terminates in a hook 57. As shown, the hook 57 overhangs the anchor portion 55 of an adjacent beam member and is supported in place thereby. An indefinite number of blocks may be supported in the manner indicated in Fig. 23 by means of the modified form of beam member there shown.

Beam members 52 are like beam members 16 except that the short legs 26 of the latter are eliminated in the former—otherwise they are similar in construction. When blocks 4 are suspended from the beam members 52, turning of the blocks about the cross bars 54 is prevented by the interengagement of the tongues 29 and grooves 30 of adjacent blocks.

While various modifications and changes may be made in the structure herein shown and described without departing from the spirit and scope of the invention, it is to be understood that only such limitations shall be placed on the invention as are imposed by the prior art and the appended claims.

What I claim as new and desire to secure by Letters Patent is:

1. A cantilever beam comprising a plurality of contiguous sections, each of said sections having interlocking supporting means for supporting one section from another from the fixed to the free end of the beam, and means on each section remote from its point of attachment to the adjacent hanger, whereby it is supported, from which a block may be suspended.

2. A cantilever beam comprising a plurality of beam members progressively arranged from the fixed to the free end of the beam, each beam member having an anchor portion and a hook portion so disposed that the hook portion of each member engages the anchor portion of an adjacent member, and means on each beam member for supporting a block.

3. A load supporting cantilever beam member comprising a beam portion having a hook at one end and an anchor portion at the other and two spaced legs extending from said beam portion and normal to its minor axis.

4. A load supporting cantilever beam member comprising a beam portion having a hook portion at one end and an anchor portion at the other, a leg portion adjacent to the hook and extending laterally from the beam portion and a leg of T-shape extending laterally from the anchor end of the beam and in the same direction as the leg at the hook end of the beam.

5. A cantilever beam member comprising a beam portion having an anchor portion at one end and an anchor engaging portion at the other, and a load suspending portion extending at an angle generally normal to the beam portion.

6. In a suspended structure, in combination, a support, and two cantilever beams having means at the fixed ends thereof for removably attaching the same to the support, said beams extending in opposite directions from the support with the fixed ends thereof disposed substantially in line, each beam having a plurality of blocks suspended therefrom, with the blocks at the fixed ends of the beam disposed in abutting relation so that the forces of compression imposed on said beams at the support are reacted and counterbalanced by blocks at the fixed ends thereof.

7. In a suspended structure, in combination a support, a cantilever beam carried by the support, said beam comprising a plurality of independent removable interlocking cantilever beam members each provided with means for suspending a block off-center therefrom with respect to its point of interlocking engagement with another beam member.

8. In a suspended structure, in combination a support, a cantilever beam carried by the support, said beam comprising a plurality of independent removable interlocking cantilever beam members, and means for suspending a block from each independent beam member from a point in the block lying in a plane removed from but parallel to a plane passing through the center of gravity thereof.

9. A beam member adapted to form the fixed end of the cantilever beam, said member having an anchor portion for supporting a cantilever beam member thereon, an upwardly extending flange of C-shape adapted to bear upon one side of a flanged beam, and to withstand the shear load of the cantilever beam, and a depending member for supporting a block therefrom.

10. A beam member adapted to form the fixed end of a cantilever beam, said member having an anchor portion for supporting a cantilever beam member thereon, an upwardly extending flange of C-shape adapted to bear upon one side of a flanged beam, and to withstand the shear load of said cantilever beam member, and means on said beam member arranged to prevent the fixed end of the cantilever beam from turning about said flanged beam, and a depending member for supporting a block therefrom.

11. A refractory block having a projection on one side thereof of generally triangular shape, the apex of said projection being uppermost and located between the ends of the block, and a groove of inverted T-shape located above the apex of said projection.

12. A refractory block having a projection on one side thereof of generally triangular shape, the apex of said projection being uppermost and located between the ends of the block, and a groove of inverted T-shape located above the apex of said projection, said block having a groove on the opposite face thereof substantially the same size and shape as the triangular projection and occupying the same relative position.

13. A cantilever beam comprising a main or abutment hanger adapted to be non-rigidly attached to a support and a plurality of individual hangers arranged in contiguous relation from the main hanger to the free end of the beam, each hanger being provided with means whereby the hanger adjacent the main hanger may be supported thereby and each succeeding hanger towards the free end of the beam may be attached to and supported by the adjacent preceding hanger, each said hanger being provided with means remote from its point of attachment to an adjacent preceding hanger for supporting a block.

14. A cantilever beam comprising a main or abutment hanger adapted to be attached to a support and a plurality of individual hangers arranged in contiguous relation from the main hanger to the free end of the beam, each hanger being provided with means whereby the hanger adjacent the main hanger may be removably supported thereby and each succeeding hanger towards the free end of the beam may be removably attached to and supported by the adjacent preceding hanger, each said hanger being provided with means remote from its point of attachment to an adjacent preceding hanger for supporting a block.

15. A cantilever beam for individually and removably supporting roof blocks to form a suspended roof comprising an abutment hanger adapted to be attached to an overhead beam or support and forming the fixed end of the cantilever beam, and a plurality of individual hangers arranged in line and in contiguous relation from the fixed to the free end of the beam, means on each hanger for supporting the adjacent hanger on a side towards the free end of the beam, and means on each hanger from which a block may be suspended.

16. The combination with a refractory block, utilized in furnace roof and wall construction, having at one end thereof, a recess in one face thereof and a recess in the opposite face occupying substantially the same position as the first mentioned recess, said recesses converging towards each other and terminating at the end of the block, of a hanger comprising two spaced members of unequal lengths integrally connected at their upper ends and having a spread which is less than the width of the block between said recessed faces the longer of said hanger members having means to interlock with one of said grooves, said hanger being placed in operative or block supporting position in the recesses by tilting at an angle when said spaced members are initially inserted in the grooves and then tilting to a vertical position and when in operative position, the spaced hanger members are located substantially wholly within the faces of the block, and means on the hanger for removably supporting it from a beam or support.

In testimony whereof, I have hereunto subscribed my name this 3rd day of April, 1930.

LEVI S. LONGENECKER.